United States Patent [19]
Kawamura et al.

[11] Patent Number: 4,595,956
[45] Date of Patent: Jun. 17, 1986

[54] IMAGE PROCESSING APPARATUS

[75] Inventors: Naoto Kawamura, Inagi; Yukio Masuda, Kawasaki, both of Japan

[73] Assignee: Canon Kabushiki Kaisha, Tokyo, Japan

[21] Appl. No.: 640,539

[22] Filed: Aug. 14, 1984

Related U.S. Application Data

[63] Continuation of Ser. No. 360,691, Mar. 22, 1982, abandoned.

[30] Foreign Application Priority Data

Mar. 26, 1981 [JP] Japan ............................. 56-43186

[51] Int. Cl.⁴ ............................................. H04N 1/387
[52] U.S. Cl. ..................................... 358/283; 358/298
[58] Field of Search ............... 358/283, 298, 280, 81, 358/78

[56] References Cited

U.S. PATENT DOCUMENTS 3,922,484 11/1975 Keller ..................................... 358/81
3,977,007 8/1976 Berry ..................................... 358/283
4,339,774 7/1982 Temple ................................. 358/283
4,342,051 7/1982 Suzuki .................................. 358/283
4,349,846 9/1982 Sekigawa ............................ 358/283

Primary Examiner—Howard W. Britton
Attorney, Agent, or Firm—Fitzpatrick, Cella, Harper & Scinto

[57] ABSTRACT

An image processing apparatus has an input section for converting input image information into a luminance signal, a memory to store the digitized luminance signal, a central processing unit for determining the matrix size for each picture element of the input image information so as to allow output of high space frequency components of input image information with matrices of small size and low space frequency components with matrices of large size, an outline emphasis circuit for emphasizing the outline when the image information is output with matrices of large size, and an output section for recording or displaying the input image information. Halftone images of excellent resolution and gradation can be output with a small memory capacity.

21 Claims, 56 Drawing Figures

FIG. 9A  "MXS"

FIG. 9B  "MXL"

H ADDRESS →

|   | 0 | 1 | 2 | 3 | 4 | 5 | 6 | 7 | 8 |
|---|---|---|---|---|---|---|---|---|---|
| 0 | (2) | (1) | (4) | (0) | (4) | (1) |   |   |   |
| 1 | (1) | (2) | (0) | (0) | (0) | (1) |   |   |   |
| 2 |   |   |   |   |   |   |   |   |   |
| 3 |   |   |   |   |   |   |   |   |   |
| 4 |   |   |   |   |   |   |   |   |   |
| 5 |   |   |   |   |   |   |   |   |   |

V ADDRESS ↓

| PIXEL 1 | PIXEL 2 |
|---------|---------|
| PIXEL 3 | PIXEL 4 |

FIG. 20

| 0 | 0 | 0 | 0 | 1 | 0 | 0 | 0 | 1 | 0 | 0 | 1 | 0 | 1 | 0 |

OVER FLOW | MATRIX SIZE | PIXEL 1 | PIXEL 2 | PIXEL 3 | PIXEL 4

IMAGE PROCESSING APPARATUS

This application is a continuation of application Ser. No. 360,691, filed Mar. 22, 1982, now abandoned.

BACKGROUND OF THE INVENTION

1. Field of the Invention

The present invention relates to an image processing apparatus for outputting halftone images having improved resolution and gradation.

2. Brief Description of the Prior Art

A scanning system having a rotary polyhedral mirror or an oscillating mirror has been widely adopted in various types of like facsimiles, display devices, recording devices and the since the scanning angle can be made large, the color dispersion is small, and so on. In particular, a rotary polyhedral mirror has been widely adopted for high-speed scanners.

As a conventional method for recording or displaying halftone images with a scanning system of the type described above, there is known a method for reproducing halftone images by dividing one picture element on a recording or displaying surface into a matrix of $n \times n$ (where n is a positive integer) micropicture elements and by appropriately arranging white micropicture elements and black micropicture elements in the matrix. FIGS. 1(A) to 1(E) show examples of matrices according to such a recording system. According to this recording system, a picture element 11 consists of $2 \times 2$ micropicture elements 13. In order to obtain halftone images with such a picture element configuration, images of five sequentially increasing gradations may be obtained by sequentially increasing the number of micropicture elements to be displayed in black as shown in FIGS. 1(A) to 1(E). In general, with a micropicture element matrix of $n \times n$ micropicture elements, it is possible to obtain images of $(n \times n + 1)$ gradations. According to this system for reproducing halftone images, since micropicture elements need only be recorded as binary values of white and black, the overall system may be of simple construction. Furthermore, since the gamma of photographic emulsion, the ratio of the output density to the input light amount can be nonlinear, the kind of photosensitive body that can be used is not limited. On the other hand, according to this system, since one picture element consists of a plurality of micropicture elements, the size of the individual picture element is greater, resulting in lower resolution of an image. In order to solve this problem, it is necessary to decrease the size of the picture element. The size of the micropicture elements then must be made extremely small for this purpose. When this system is adopted for a laser beam printer, for instance, the diameter of the beam spot on a photosensitive drum must therefore be very small. Such a requirement may be met with an optical system. However, satisfactory response often may not be obtained with micropicture elements of such a small size because of the characteristics of the photosensitive body.

Figure 1A:
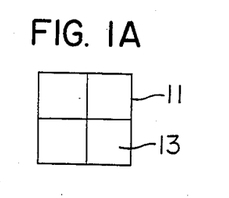
FIGS. 1A, 1B, 1C, 1D and 1E are views showing examples of matrices.
Figure 1B:
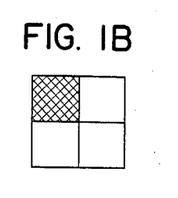
Figure 1C:
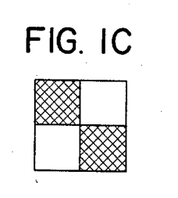
Figure 1D:
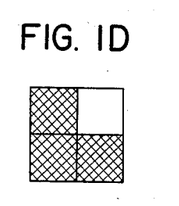
Figure 1E:
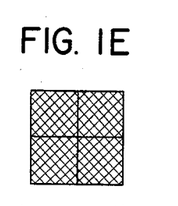
Figure 2:
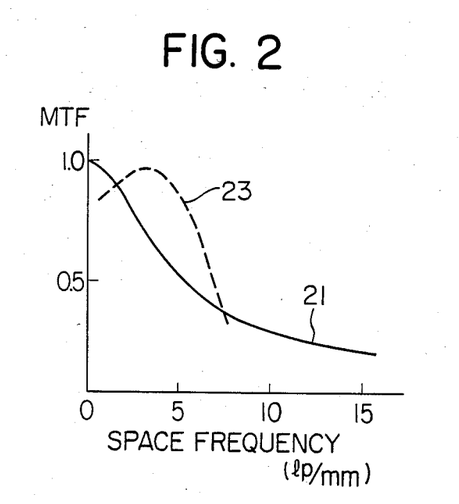
FIG. 2 is a graph showing the characteristics of a photosensitive body.

FIG. 2 is a graph showing the characteristics of a photosensitive body wherein the space frequency is plotted along the abscissa and the MTF (modulation transfer function) value is plotted along the ordinate. These characteristics correspond to a photosensitive body for electrophotography. Curve 21 represents the electrostatic latent image characteristic, while curve 23 represents the development/transfer characteristic. As may be seen from these characteristics, the higher the space frequency, the lower the MTF value. For this reason, image outputs of satisfactory gradation cannot be obtained with the halftone image reproducing system as described above which requires correct response from individual micropicture elements. When the size of the picture element is made smaller for actual recording according to this system, the individual micropicture elements are not completely recorded in black. Then, an increase or decrease by one of micropicture elements which are recorded in black is not reflected in the output. For this reason, with the system as described above, when the size of the picture elements is made smaller for the purpose of improving the resolution, gradation is impaired. On the other hand, when the size of the picture element is increased for the purpose of improving gradation, the resolution is degraded.

SUMMARY OF THE INVENTION

It is an object of the present invention to provide an image processing apparatus which is capable of recording and reproducing halftone images with high resolution and excellent gradation.

It is another object of the present invention to provide an image processing apparatus which is capable of reproducing excellent halftone images with a simple construction.

It is still another object of the present invention to provide an image processing apparatus which is capable of correctly expressing halftone images while requiring a smaller memory capacity.

The above and the other objects and features of the present invention will become apparent from the following description of the preferred embodiments when taken in conjunction with the accompanying drawings.

BRIEF DESCRIPTION OF THE DRAWINGS

FIGS. 6A, 6B, 6C, 6D, 6E, 6F, 6G, 6H, 6I, 6J, 6K, 6L, 7M, 6N, 6O, and 6P are views showing the patterns of examples of halftone displays with a single picture element;

FIG. 16 shows how FIGS. 16A and 16B are related to illustrate a flowchart for outputting image information;

DETAILED DESCRIPTION OF THE PREFERRED EMBODIMENT

The present invention will now be described with reference to the accompanying drawings.

Figure 3:
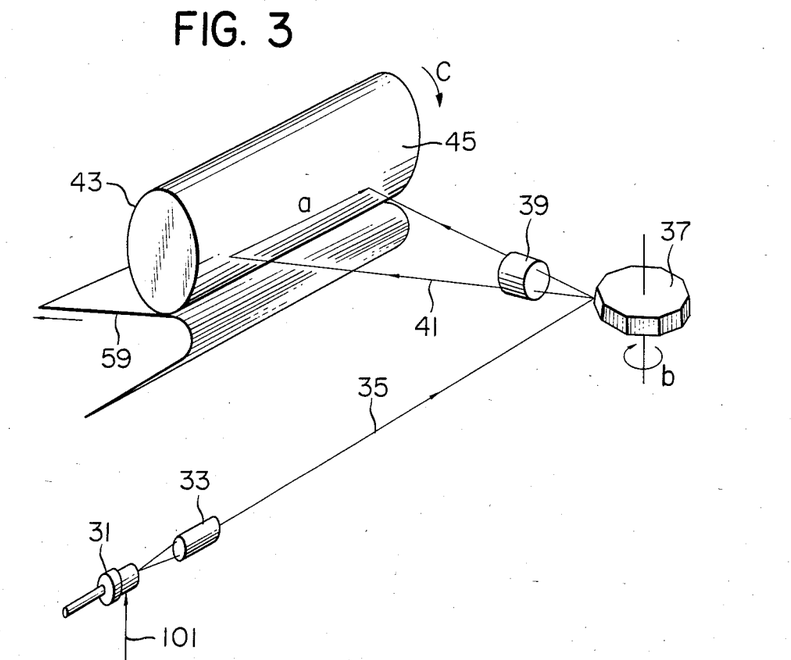
FIGS. 3 and 4 are views showing an output section of an image processing apparatus according to an embodiment of the present invention.

FIG. 3 shows an output section of an image processing apparatus according to an embodiment of the present invention. A laser beam radiated by a semiconductor laser 31 in response to an output signal 101 is converted into parallel beams 35 by a collimator lens 33. These parallel beams 35 are deflected by a rotary polyhedral mirror 37 and are then passed through an f.$\theta$ lens 39. Beams 41 emerging from the f.$\theta$ lens 39 are radiated onto a photosensitive body surface 45 of a photosensitive drum 43. Main scanning (direction indicated by arrow a) of the beams is performed by rotating the rotary polyhedral mirror 37 about an axis thereof in the direction indicated by arrow b. Subscanning is performed by rotating the photosensitive drum 43 in the direction indicated by arrow c. An image pattern containing a desired halftone image can be formed on the photosensitive body surface 45 by turning the semiconductor laser 41 on and off with a modulation means to be described later.

Figure 4:
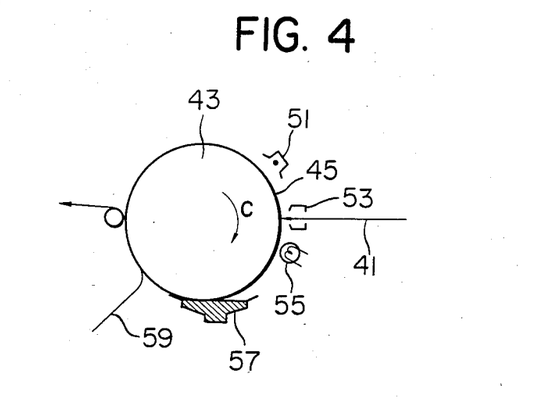

FIG. 4 shows the details of the output section according to the embodiment shown in FIG. 3. The photosensitive body surface 45 of the photosensitive drum 43 is of so-called NP type wherein an insulation layer is formed on a layer coated with a photoconductive substance.

In order to output an image, the entire photosensitive body surface 45 is uniformly charged positively by corona discharge with a sensitizer 51. Subsequently, ac corona discharge is performed by a charge remover 53 while radiating the photosensitive body surface 45 with the laser beams 41. When the photosensitive layer is uniformly exposed to light by an overall exposure lamp 55, the image information can be patterned on the photosensitive body surface 45 as a surface potential distribution, that is, as an electrostatic latent image. Then, toner particles of opposite polarity supplied from a developing unit 57 are attached to the photosensitive body surface 45 to develop the electrostatic latent image thereon. The developed electrostatic latent image is transferred onto a transfer material (paper sheet) 59.

Since the output section shown in FIGS. 3 and 4 is of known construction, a further description of it will not be made.

Figure 5:
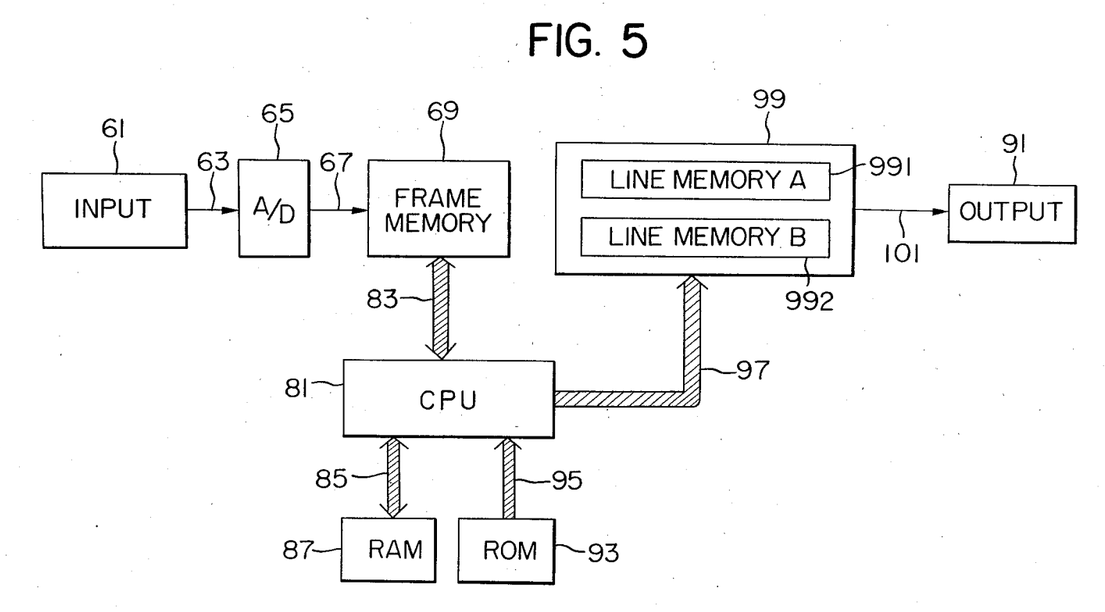
FIG. 5 is a block diagram of the apparatus according to the present invention.
Figure 6A:
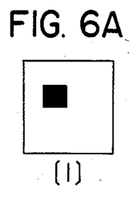
Figure 6B:
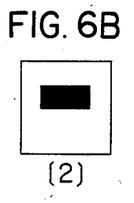
Figure 6C:
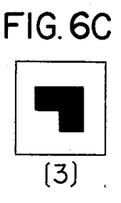
Figure 6D:
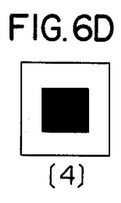
Figure 6E:
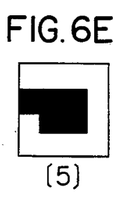
Figure 6F:
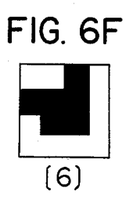
Figure 6G:
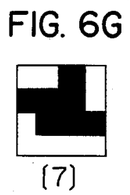
Figure 6H:
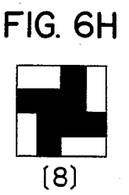
Figure 6I:
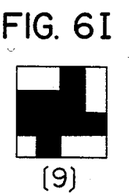
Figure 6J:
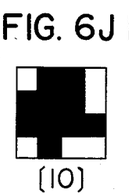
Figure 6K:
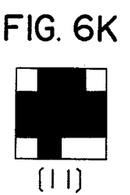
Figure 6L:
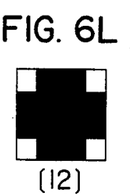
Figure 6M:
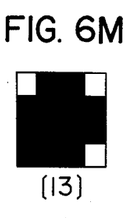
Figure 6N:
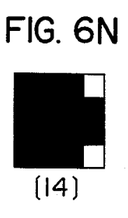
Figure 6O:
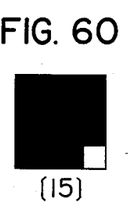
Figure 6P:
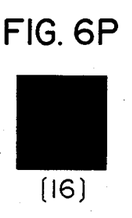

FIG. 5 shows a signal processing apparatus for image output. An input section 61 such as a TV camera converts two-dimensional image information into a one-dimensional (time-serial) luminance signal 63. The analog luminance signal 63 is supplied to an analog-to-digital converter (to be referred to as an A/D converter hereinafter) 65 and is converted into a digital signal 67 thereby. The digital signal 67 obtained in this manner is supplied to a frame memory 69 for storing picture information for one frame. Assume that a picture element consisting of 4×4 micropicture elements as shown in FIGS. 6(A) to 6(P) is selected as a halftone image to be recorded. Then, density patterns of 16 different kinds (17 different kinds if all white is regarded as an image as well) may be obtained according to the area ratio of white to black. Therefore, in order to perform A/D conversion of the input signal, it is sufficient to perform quantization with a minimum of 16 levels, that is, it suffices to perform 4-bit A/D conversion. If A/D conversion of the input signals is regarded as a kind of encoding, the picture element consisting of n×m micropicture elements and k-bit quantization need only satisfy relation:

$$2^k \leq n \times m \tag{1}$$

If the inequality is satisfied in relation (1) above, the number of quantization levels of the input signal is smaller than that for other density patterns. Therefore, gamma transform can be performed by eliminating part of the density pattern. Then, the digital signal obtained by A/D conversion of the input signal can be regarded as a code signal. Then, only the dot matrix arrangement corresponding to this code signal need be determined. In this manner, during the output, a density pattern (dot pattern) corresponding to the code signal is output.

Figure 7:
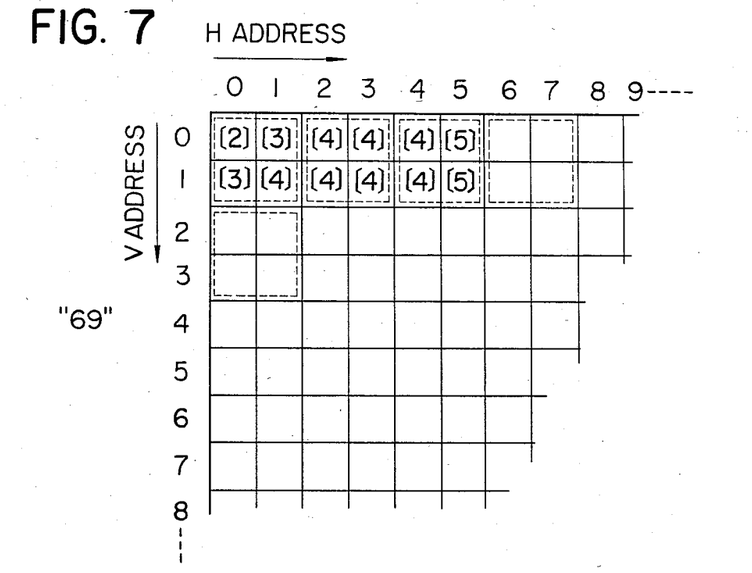
FIGS. 7 and 18 are views showing a frame memory 69 corresponding to the arrangement of picture elements to be recorded.

As shown in FIG. 7, H addresses (corresponding to the direction of main scanning of the input unit) and V addresses (corresponding to the direction of subscanning) are allocated in a frame memory 69. Input information for each picture element is stored in a corresponding address of the frame memory 69. Numbers in parentheses in FIG. 7 indicate, in simpler manner, densities of the respective picture elements corresponding to the respective addresses of the frame memory 69. If the A/D converter 65 is of 4-bit construction, a code signal representing the density of each picture element to be stored in each address of the frame memory 69 consists of a code information part of 4 bits $d_0$ to $d_3$ and another bit $d_4$ for determining the matrix size shown in FIG. 8. The matrix size will be described in further detail hereinafter. For picture information corresponding to each picture element stored in the frame memory 69, a central processing unit (to be referred to as a CPU hereinafter) 81 determines the content of bit $d_4$ at the head of five bits. Thereafter, the CPU 81 stores the picture information back into the frame memory 69. This operation is repeated for all the picture elements (for one frame) of the frame memory 69.

Figure 9A:
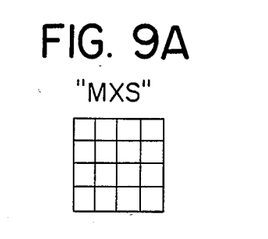
FIGS. 9(A) and 9(B) are views showing examples of matrices of one picture element.
Figure 9B:
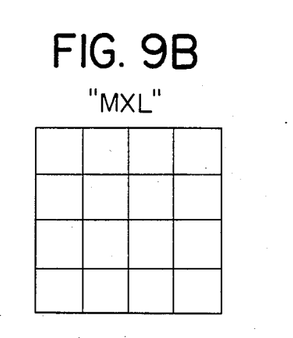

The method for determining the matrix size will now be described. The matrix sizes to be used for recording an output image are assumed to have a ratio of 1:2 as shown in FIGS. 9(A) and 9(B) herein for the sake of simplicity.

The matrix size is determined in the following manner. When the image information is changing at a fast speed, the image information is output with a matrix MXS of small size shown in FIG. 9(A). When the image information is not changing at such a fast speed, the image information is output with a matrix MXL of great size (the output method will be described hereinafter).

According to the apparatus of the present illustrative embodiment, the fine part of an image (high space frequency components) is output with picture elements of small matrix size. On the other hand, the rough part of the image (low space frequency components) is output with picture elements of great matrix size. Accordingly, both resolution and gradation are simultaneously improved. This is based on the fundamental characteristic of human perception. According to this fundamental characteristic, human eyes require higher gradation for perception of lower space frequency components (e.g., human skin or the like) but require only low gradation for perception of higher space frequency components (e.g., an outline or the like). Taking this characteristic into consideration, sufficient gradation may be achieved if the lower space frequency components are output with matrices of great size. In this case, resolution need not be made high for allowing perception of low space frequency components. Furthermore, for allowing perception of high space frequency components, satisfactory resolution may be obtained by outputting the input information with matrices of small size. In this case, gradation need not be made high.

The CPU 81 performs the following steps in order to discriminate if the output is to be made with matrices of small or great size.

According to a first rule, rule 1, information is scanned in units of four picture elements. If the information corresponding to all the four picture elements remains the same, output is made with matrices MXL of great size. Taking the example of addresses (H, V)=(2, 0), (3, 0), (2, 1), and (3, 1) of four picture elements shown in FIG. 7, all have same density 4. In such a case, output is performed with matrices of great size as at A in FIG. 10.

According to a second rule, rule 2, if information scanned in units of four picture elements involves a density difference of within 1, output is made with matrices MXL of great size. For example, in the case of addresses (H, V)=(4, 0), (5, 0), (4, 1), and (5, 1) of four addresses shown in FIG. 7, densities are 4 and 5, providing a difference of 1. In such a case, output is made with matrices MXL of great size as seen at B in FIG. 10. The density in this case is determined by the quantization level closest to the mean density of the four picture elements.

Figure 10:
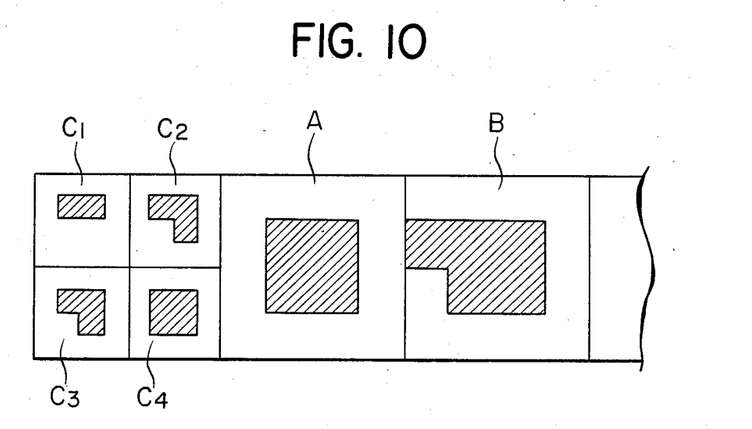
FIG. 10 is a view showing recorded images.

According to a third rule, rule 3, if the density difference of all four picture elements is more than 1 (2 or more), output is made with matrices MXS of small size. In the example of addresses (H, V)=(0, 0), (1, 0), (0, 1), and (1, 1) of the four picture elements shown in FIG. 7, the densities are 2, 3 and 4, providing a density difference greater than 1. In such a case, density patterns C1, C2, C3, and C4 in FIG. 10 are output with matrices MXS of small size. For the sake of simplicity, the density difference 1 is used as a reference. However, other values may be used for the density difference.

According to these three rules, whether to output with matrices MXL of great size or with matrices MXS of small size is determined for all the picture elements. In this case, the combination of the four picture elements as a unit is determined as seen bounded by dotted lines shown in FIG. 7 starting from the upper left corner ((V, H)=(0, 0)) of the frame memory 69. Therefore, the number of the address of the frame memory 69 is an integer multiple of 2 in both the main scanning direction and the subscanning direction.

A separate effect of rule 2 is that pseudooutlines are moderated. As has been described above, it is preferable to output matrices of great size in order to achieve excellent gradation. When part of the image with small density change (e.g., human skin or the like) is output with matrices of small size, a pseudooutline is produced. Therefore, when a small density difference is involved, a natural and smooth gradation is achieved if such a part is output with matrices of great size according to rule 2.

If low space frequency components (small density change) are output with matrices of small size, a pseudooutline is disadvantageously emphasized. According to the apparatus of the present invention, this effect is eliminated by incorporation of rule 2. However, the disadvantage of rule 2 resides in the fact that a density difference of 1 is a small piece of information and tends to be neglected. However, this disadvantage of rule 2 can be prevented by performing image processing for emphasis of the outline as shown in FIG. 11 before storing the density data in the form of code signals in the frame memory 69.

Figure 11:
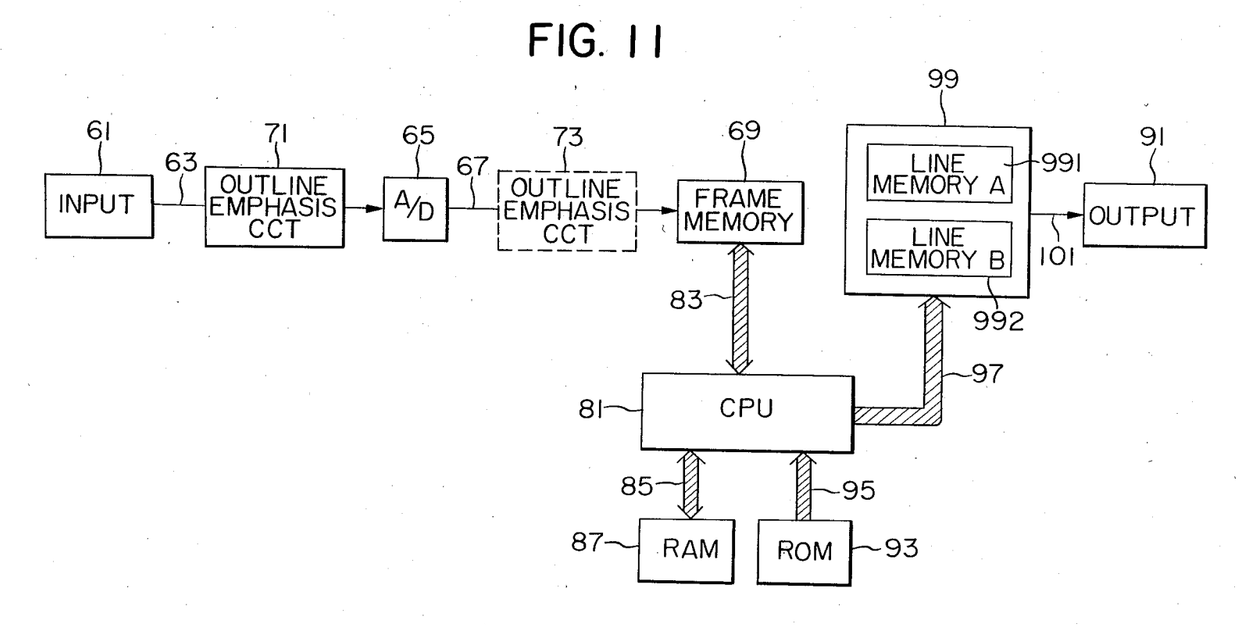
FIG. 11 is a block diagram including an outline emphasis circuit.

More specifically, the disadvantage of rule 2 can be prevented by incorporating an outline emphasis circuit 71 in front of the A/D converter 65 or incorporating an outline emphasis circuit 73 therebehind in FIG. 11. The outline emphasis circuits 71 and 73 utilize only known techniques and a detailed description thereof will not therefore be made. The same reference numerals as in FIG. 11 denote the same parts as in FIG. 5.

Figure 8:
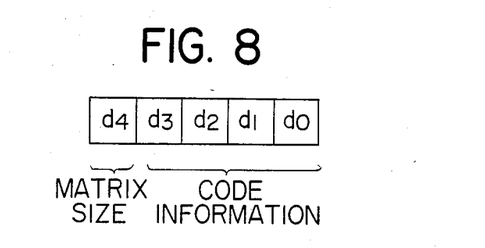
FIG. 8 is a view showing the code information of encoded signals.
Figure 12:
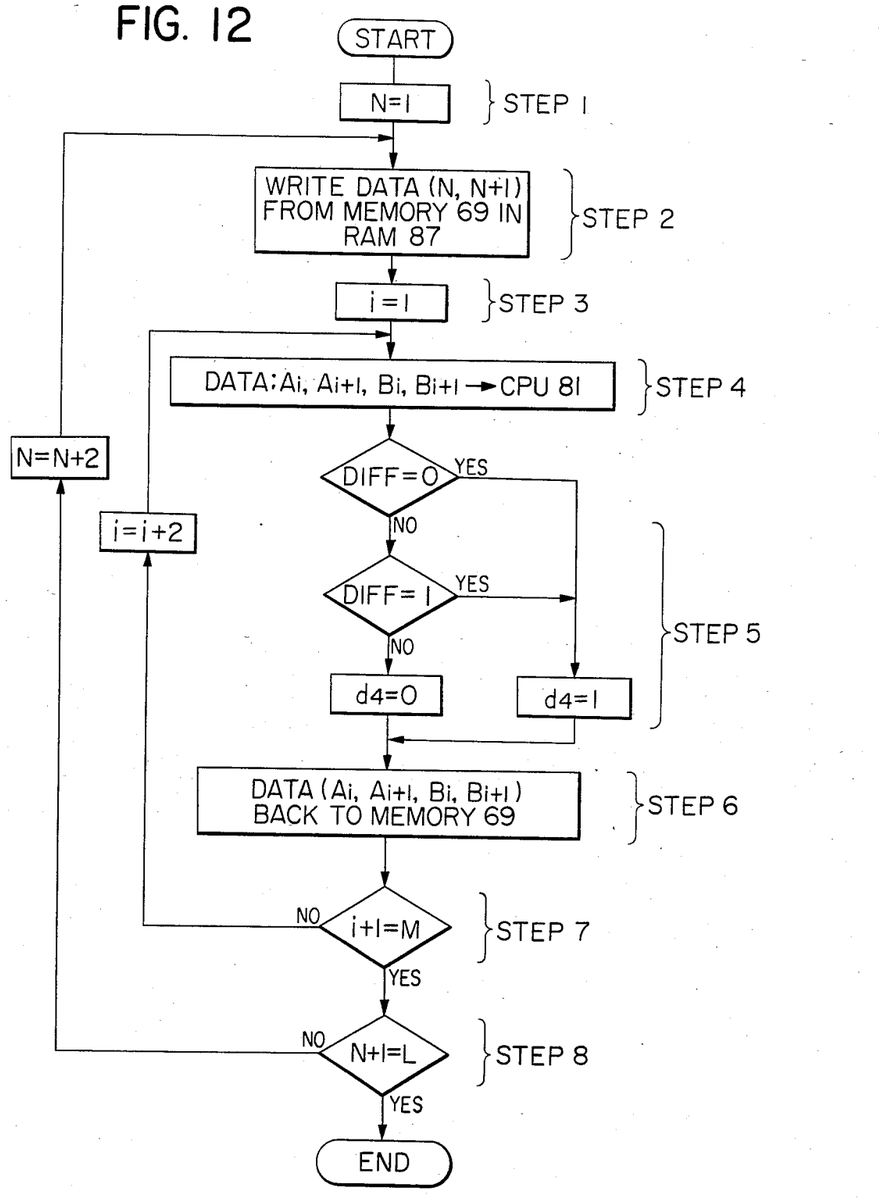
FIG. 12 is a flowchart for determining the matrix size of the picture element.
Figure 13:
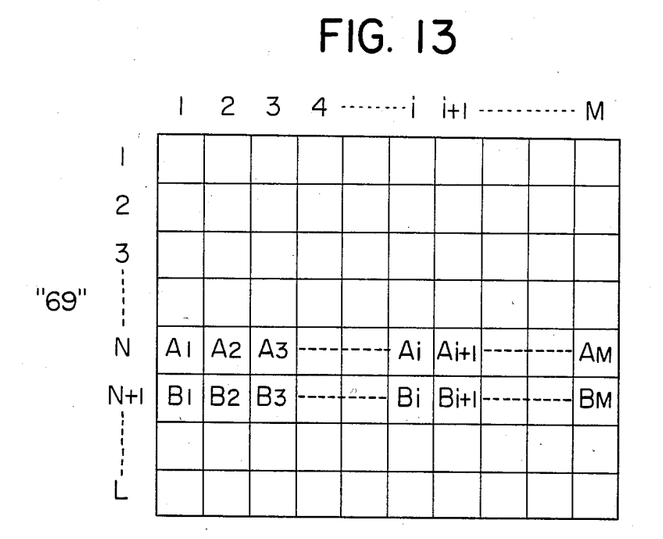
FIG. 13 is a view showing respective addresses of the frame memory 69.

The decision of the matrix size by the CPU 81 is performed by storing "1" at the initial bit $d_4$ of 5 bits of each picture element shown in FIG. 8 if the matrix size is to be great and "0" in the same bit if the matrix size is to be small. In order to perform such a discrimination, the CPU 81 loads the information stored in the frame memory 69 into a random access memory (to be referred to as a RAM hereinafter) 87 as a working area through bus lines 83 and 85. The RAM 87 performs the operation and returns the operation result to the frame memory 69. The flow of processing for discrimination of the matrix size to be performed by the CPU 81 is shown in FIG. 12. FIG. 13 shows the addresses of the frame memory 69. In FIG. 13, M represents the number of picture elements in one line while L represents the number of lines of the frame memory 69. $A_i$ represents the address of line N, while $B_i$ represents the address of line (N+1).

The flow of processing will now be described with reference to the flowchart shown in FIG. 12.

In step 1, line N of the frame memory 69 is set to 1. In step 2, data for two lines (N, N+1) of the frame memory 69 is read out and is written in the RAM 87. In step 3, the addresses of each line are set to 1. In step 4, data of $A_i$, $A_{i+1}$, $B_i$, and $B_{i+1}$ stored in the RAM 87 is loaded in the CPU 81. In step 5, the CPU 81 determines the difference of data $A_i$, $A_{i+1}$, $B_i$, and $B_{i+1}$.

If the difference is "0" or "1", "1" is stored in the initial bit $d_4$ of 5 bits of each picture element shown in FIG. 8. On the other hand, if the difference is greater than "1", "0" is stored in bit $d_4$. In step 6, data $A_i$, $A_{i+1}$, $B_i$, and $B_{i+1}$ with the initial bit $d_4$ storing bit information is returned to the frame memory 69. In step 7, it is discriminated if steps 4 to 6 have been completed for all the data of the two lines designated. If the discrimination result in step 7 is NO, steps 4 to 6 are repeated. In step 8, it is discriminated if steps 2 to 7 have been performed for all the lines of the frame memory 69. If the discrimination result obtained in step 8 is YES, the CPU 81 terminates the flow for determining the matrix size. If the discrimination result obtained in step 8 is NO, steps 2 to 7 are repeated.

The image information including the data on the matrix size stored in the frame memory 69 is output according to the flow to be described below. An output section 91 comprises a laser beam printer which is described with reference to FIGS. 3 and 4.

The CPU 81 retrieves the information stored in the frame memory 69 in units of four picture elements (bounded by dotted lines in FIG. 7). It is discriminated if the bit $d_4$ of the retrieved image information which indicates the matrix size is "1" or "0". If "0" is stored in bit $d_4$, a matrix size instruction is output so as to allow output of image information with matrices MXS of small size. If "1" is stored in the bit $d_4$, a matrix size instruction is output so as to allow output of the image information with matrices MXL of great size. The dot matrix patterns corresponding to each value of the image information are stored in advance in a read-only memory (to be referred to as a ROM hereinafter) 93. Pattern data corresponding the code information of bits $d_0$ to $d_3$ is read out from the ROM 93 through a bus line 95. In accordance with the matrix size instruction as described above, the pattern data is supplied to a line memory 99 through a bus line 97 and the pattern data for each picture element is written according to the determined matrix size in the line memory 99. An output signal 101 is output from the line memory 99 based on the data stored therein. The output signal 101 is received by the output section 91, which then sequentially records according to the procedure described with reference to FIGS. 3 and 4.

Figure 14:
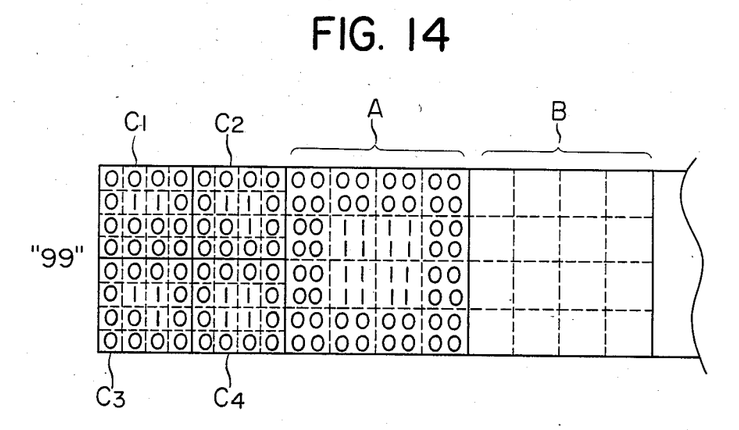
FIG. 14 shows the state in which the image information is stored in the frame memory 69.

The line memory 99 has a capacity such that it is capable of storing dot patterns corresponding to two picture elements with small matrix size in the V direction (one picture element with great matrix size) and of storing dot patterns corresponding to picture elements with small matrix size of one line in H direction of the frame memory 69. In other words, the line memory 69 has a capacity for allowing storage of dot patterns corresponding to the picture elements of two lines of the frame memory 69. The line memory 99 has 16 bits ($=4\times 4$) for one picture element of small matrix size; each bit stores "1" (black) or "0" (white). The dot pattern is thus stored in the line memory 99 as shown in FIG. 14. When the dot patterns are output from the output section 91 for recording, the dot pattern data is first read out in the row direction (main scanning) and is then read out in the column direction (subscanning). If the output signal 101 from the line memory 99 is "0", the laser 31 is turned off. When the output signal 101 is "1", the laser 31 is turned on. Thus, an image of white and black is recorded on the transfer material 59.

Figure 15A:
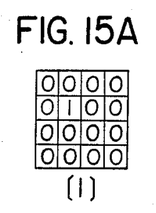
FIGS. 15A, 15B, 15C, 15D, 15E, 15F, 15G, 15H, 15I, 15J, 15K, 15L, 15M, 15N, 15O, and 15P are views showing data stored at each bit of the density pattern.
Figure 15B:
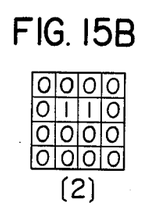
Figure 15C:
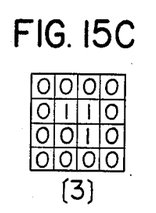
Figure 15D:
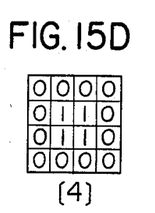
Figure 15E:
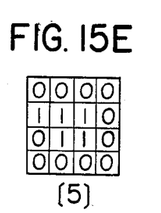
Figure 15F:
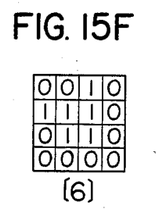
Figure 15G:
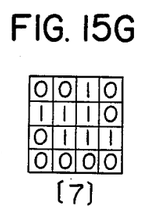
Figure 15H:
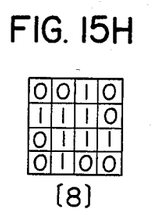
Figure 15I:
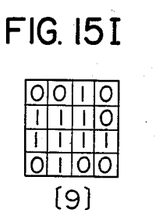
Figure 15J:
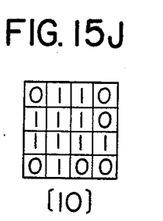
Figure 15K:
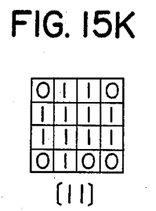
Figure 15L:
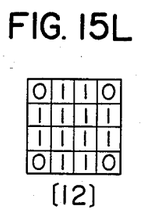
Figure 15M:
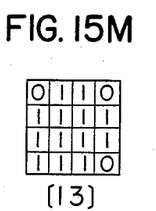
Figure 15N:
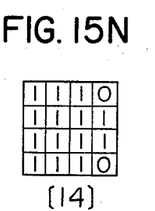
Figure 15O:
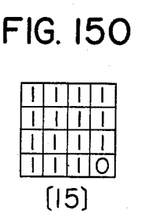
Figure 15P:
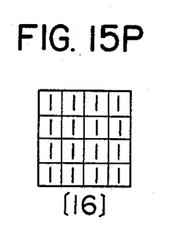

FIGS. 15(A) to 15(P) show the dot patterns stored in the ROM 93. The densities of the patterns shown in FIGS. 15(A) to 15(P) respectively correspond to 1, 2, . . ., 16. Therefore, if the value read out from the frame memory 69 is 2, and the information of bit $d_4$ representing the matrix size is "0", the dot pattern data as shown in FIG. 15(B) is transferred to the line memory 99. At the same time, the dot pattern data of corresponding densities is simultaneously transferred to the line memory 99 for the other three picture elements.

If information stored at bit $d_4$ representing the matrix size is "0", this means that data for all the four picture elements is the same (rule 1) or the density difference involved is is more than 1 (rule 1). In such a case, four pieces of data corresponding to four picture elements are added to provide a mean value. The mean value is rounded to give an integer. The dot pattern of the quantization level closest to the integer thus obtained is selected from those shown in FIGS. 15(A) to 15(P). Since the actual density data has four bits, four density data pieces are added and a mean value is obtained. Thereafter, the matrix size is doubled, and the matrix MXL of great size is stored in the line memory 99. As a result, the information stored in the frame memory 69 shown in FIG. 7 is converted into the dot arrangement as shown in FIG. 14 by the line memory 99. Then this dot arrangement is output to the output section 91 comprising the laser beam printer so as to output the recording pattern shown in FIG. 10. In this manner, a density pattern having two matrix sizes is output.

Figures 16, 16B:
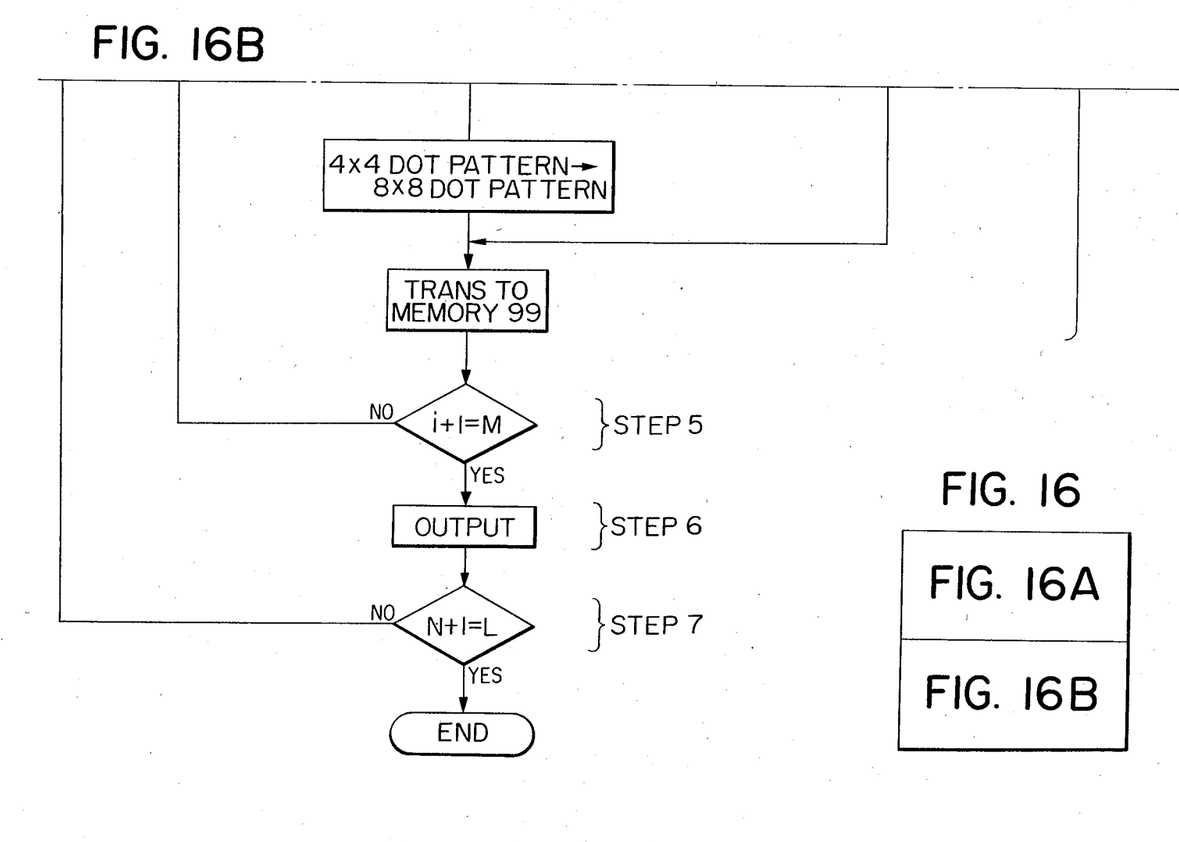

The mode of operation as described above will be described with reference to the flow chart of FIGS. 16A and 16B.

Figure 16A:
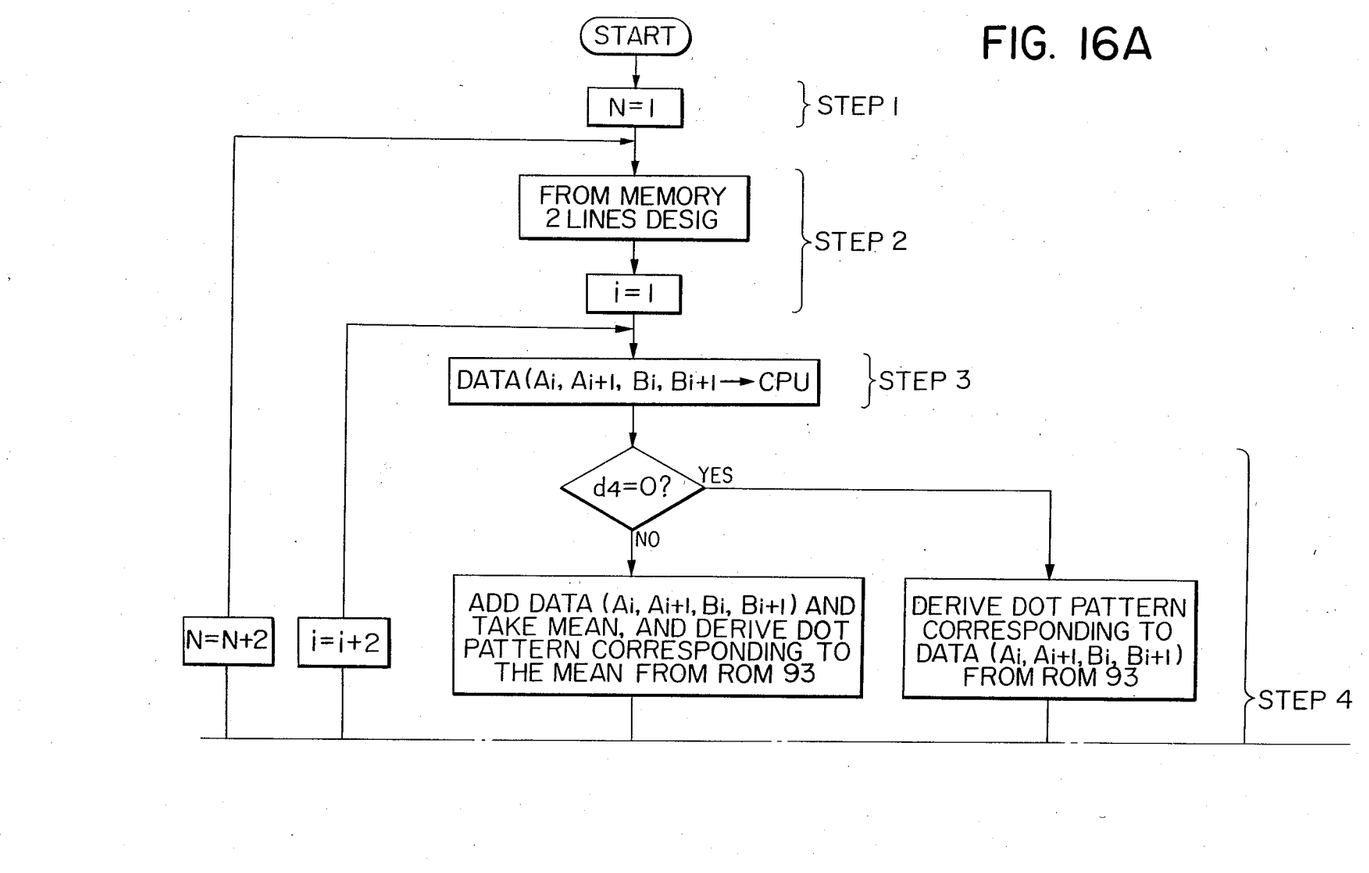

In step 1 shown in FIG. 16A, the line N of the frame memory 69 is set to 1.

In step 2, two lines (N, N+1) of the frame memory 69 are designated, and the addresses of each line are set to 1. In step 3, the four addresses $A_i$, $A_{i+1}$, $B_i$, and $B_{i+1}$ of each line designated in step 2 are loaded in the CPU 81. In step 4, it is discriminated if bit $d_4$ representing the matrix size is "0" or "1". If bit $d_4$ is "0" which represents the small matrix size, the dot pattern of small matrix size corresponding to data of addresses $A_i$, $A_{i+1}$, $B_i$, and $B_{i+1}$ is read out from the ROM 93 and transferred to the line memory 99. On the other hand, if bit $d_4$ is "1" which represents the great matrix size, the CPU 81 adds data pieces corresponding to the four addresses $A_i$, $A_{i+1}$, $B_i$, and $B_{i+1}$ and takes a mean value, and reads out the dot pattern corresponding to the obtained mean value from the ROM 93. Thereafter, the matrix size is doubled and is transferred to the line memory 99 as the dot pattern of great matrix size. In step 5, it is discriminated if steps 3 and 4 have been performed for all the pieces of data corresponding to the two designated lines. If all the pieces of data for the two lines are not completely transferred to the line memory 99, steps 3 and 4 are repeated. In step 6, the data (dot pattern) written in the line memory 99 is output. In step 7, it is discriminated if steps 2 to 6 have been performed for all the lines of the frame memory 69. If the discrimination result obtained in step 7 is YES, the CPU 81 stops operating. If the discrimination result obtained in step 7 is NO, steps 2 to 6 are repeated.

A description will now be made of changing of a matrix size from a dot pattern of $4\times 4$ to a dot pattern of $8\times 8$ if $d_4$ is greater than "1".

Figure 17:
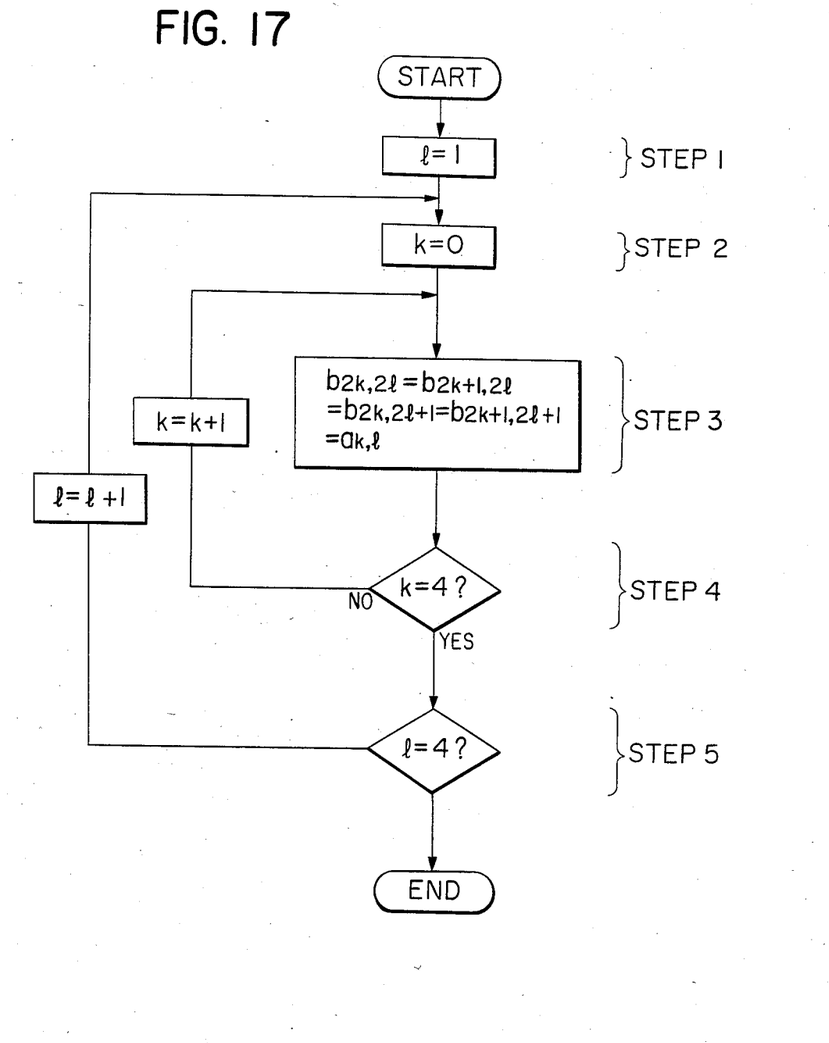
FIG. 17 is a flowchart for changing the matrix size.

FIG. 17 shows a flowchart for doubling the matrix size. In this flowchart, each piece of ROM data of $4\times 4$ dot pattern is represented by $a_{k,l}$ (where $0\leq k$, $l\leq 3$). The respective components of the $8\times 8$ dot pattern are represented by $b_{2k,2l}$, $b_{2k+1,2l}$, $b_{2k,2l+1}$, and $b_{2k+1,2l+1}$ (where $0\leq k$, $l\leq 3$).

In step 1, l is set to 1. In step 2, k is set to 0. In step 3, the respective components of the $8\times 8$ dot pattern for each component $a_{k,l}$ of the $4\times 4$ dot pattern of the ROM data are determined such that $b_{2k,2l}=b_{2k+1,2l}=b_{2k,2l+1}=b_{2k+1,2l+1}=a_{k,l}$. In step 4, it is discriminated whether or not $k=4$. If the discrimination result obtained in step 4 is NO, step 3 is repeated. It is discriminated in step 5, if $l=4$. If the discrimination result obtained in step 5 is NO, steps 2 to 4 are repeated.

In the embodiment described above, the matrix size is doubled. However, the density pattern of double matrix size may be stored in the ROM from the beginning. Further, it is possible to form the density pattern as shown in FIG. 6 without loading the information in the ROM.

The actual size of the picture element is a square having a side of 0.4 mm for a large matrix and a square having a side of 0.2 mm for a small matrix. Therefore, a micropicture element is a square having a side of 100 μm for a large matrix and a square having a side of 50 μm for a small matrix. When these micropicture elements are combined, an image is obtained. With the density pattern method as shown in FIG. 6, an output image resembling an image obtained with dot photography is obtained.

In the embodiment described above, the matrix is a square. However, matrices of squares with parts protruding therefrom or with notches, or matrices of other shapes may be used as long as they may be combined to form an image.

In the operation as described above, it takes considerable time for performing the conversion of data stored in the frame memory 69 into the dot pattern stored in the line memory 99. However, the output section 91 continuously outputs an image. Therefore, in order to eliminate the time delay, the line memory 99 comprises an A line memory 991 and a B line memory 992 of a configuration the same as that shown in FIG. 5. These memories are of the configuration as shown in FIG. 14.

While the information stored in the A line memory 991 is being output by the output section 91, the CPU 81 continuously transfers the subsequent information to the B line memory 992. By sequentially switching readout and storage, high-speed recording without time delay may be performed.

The signal processing apparatus of the present invention is not limited to the embodiment shown in FIG. 5 and various modifications may be made. For example, after A/D conversion the input signal 63, the density data may be loaded in the RAM 87 for designation of the matrix size. In this case, the image data for at least two lines must be stored in the RAM 87. In this manner, various modifications may be made as long as the basic construction remains the same.

Signal compression according to the present invention will now be described. This is an additional feature of the present invention, and is a convenient feature for allowing processing of the same quantity of data with a memory of smaller capacity.

The capacity of the frame memory 69 for storing the image data for one frame according to the method as described above is obtained as:

$$512 \times 512 \times 5/8 \div 164 \text{ (k byte)} \tag{2}$$

since the density of each picture element and matrix size are each represented in 5 bits. In this case, if the data is regarded to be stored in the frame memory 69 in the form of 5-bit codes for the respective picture elements, the information is stored in a compressed state as compared with the 16-bit dot pattern. However, the information can be further compressed by the following method.

Figure 18:
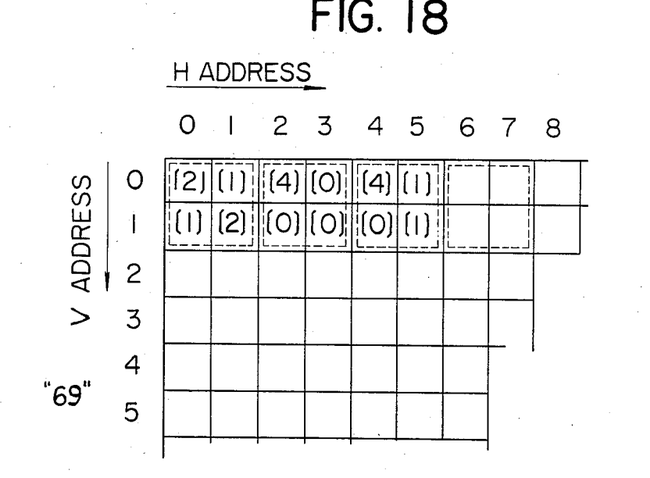
Figure 19:
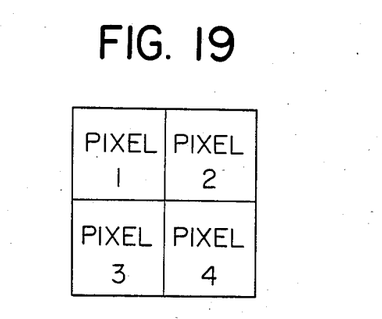
FIGS. 19 and 20 are views for explanation of the arrangement of the picture elements.
Figure 20:
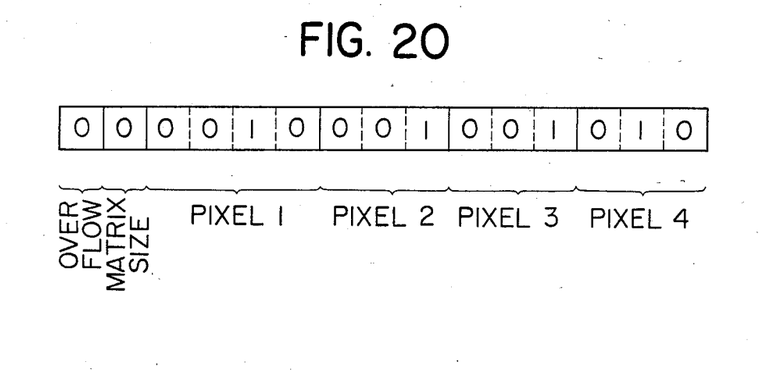

FIG. 18 shows the principle of compression according to which differential quantization is performed in units of four picture elements. In picture elements 1 to 4 shown in FIG. 19, values of picture elements 2 to 4 are provided by differences from the value of picture element 1. Then, the bit number may be decreased at part of the image where the density difference is present. FIG. 20 shows a case including picture element 1 of 4 bits, the remaining three picture elements respectively of 3 bits, the matrix size bit, and an overflow bit. Since the matrix size bit need only be supplied for each four picture elements, only 15 bits are required for four picture elements. 20 bits are required by the embodiment described above. However, since picture elements 2 to 4 cannot always be expressed by 4 bits respectively, the overflow bit is incorporated to allow storing of differential data in the next 15 bits in correspondence with the respective picture elements. Such a case rarely happens, so that the rate of compression is significantly high. In order to provide differential data, a sign "+" or "−" is generally necessary. Therefore, the initial one bit of each group of 3 bits is provided as the sign bit.

By outputting the picture elements of different matrix sizes in accordance with the space frequency characteristics of the image, resolution and gradation may be improved.

In the description presented above, one picture element consists of 4×4 micropicture elements, and the sizes of the matrix on the recording medium is limited to 2 holding a ratio of 1:2. However, the present invention is not limited to this. Thus, a number of picture element sizes may be selected.

The density pattern is not limited to that shown in FIG. 6. The kind of density pattern may be increased, or the method for recording the micropicture elements in black may be changed. Although the present invention is described with reference to electrophotography, the present invention can be applied to general recording wherein the MTF value is low with higher space frequency. The input section 61 may comprise a unit which reads an original image or a unit which receives image information. The output section 91 may comprise another type of recording device, a display device such as a CRT, or a dot matrix printer.

In summary, according to the present invention, an image processing apparatus with excellent resolution and gradation may be provided.

Finally, it is to be noted that the present invention is not limited to the particular embodiments described above, and various changes and modifications may be made within the spirit and scope of the appended claims.

We claim:

1. An image processing apparatus comprising:
   input means for entering pixel data representing image density, a plurality of said pixel data defining a block and all of said pixel data defining a number of said blocks:
   discrimination means for discriminating an image state in each said block in accordance with the difference between the image density of the respective pixel data within that block;
   output means for outputting image patterns; and
   determination means for determining an image pattern to be outputted by said output means and representing each said block on the basis of the result discrimination by said discrimination means.

2. An image processing apparatus according to claim 1, wherein said discrimination means and said determination means are incorporated in a common central processing unit.

3. An image processing apparatus according to claim 1, wherein said determination means determines that each image pattern outputted by said output means is composed of one of (1) one pixel datum, and (2) a plurality of pixel data defining one said block, on the basis of the result of discrimination by said discrimination means.

4. An image processing apparatus according to claim 1, wherein said determination means determines an image pattern to be outputted in accordance with the result of discrimination by said discrimination means and said pixel data in said block.

5. An image processing apparatus comprising:
input means for entering pixel data representative of image density; and
reproduction means for performing a half tone process on said pixel data in order to reproduce said pixel data as a half tone image, said reproduction means including output means for outputting an image pattern in accordance with said pixel data, and determination means for determining the size of said image pattern to be outputted by said output means in accordance with a plurality of said pixel data.

6. An image processing apparatus according to claim 5, wherein said reproduction means includes a central processing unit.

7. An image processing apparatus according to claim 5, wherein said determination means determines the size of said image pattern to be outputted in accordance with an image state in each block defined by a plurality of said pixel data.

8. An image processing apparatus according to claim 5, wherein said determination means includes discrimination means for discriminating an image state of a block comprising a plurality of the pixel data, said determination means determining the size of said image pattern to be outputted by said output means in accordance with the result of discrimination by said discrimination means.

9. An image processing apparatus according to claim 8, wherein said determination means determines that each said image pattern is composed of one of (1) one pixel datum, and (2) a plurality of pixel data, on the basis of the result of the discrimination by said discrimination means.

10. An image processing apparatus according to claim 8, wherein a plurality of pixel data define a block and all of said pixel data define a number of said blocks and wherein said discrimination means discriminates an image state in each said block in accordance with the difference between the density of the respective pixel data in that block.

11. An image processing apparatus comprising:
input means for entering pixel data representing image density; and
reproduction means for performing a half tone process on said pixel data to reproduce said pixel data as a half tone image, said reproduction means including switch means for switching modes for performance of said half tone process, one said mode including production of one image pattern unit from one pixel datum, said switch means being operable to switch said reproduction means from said one mode for performing a half tone process to another mode in which said reproduction means produces one image pattern unit from a plurality of pixel data.

12. An image processing apparatus according to claim 11, wherein a plurality of pixel data entered by said input means defined a block and all of said pixed data define a number of said blocks and wherein said apparatus further comprises discrimination means for discriminating an image state of the pixel data in each said block 13. An image processing apparatus according to claim 12, wherein said switch means switches said modes on the basis of the result of discrimination by said discrimination means.

14. An image processing apparatus according to claim 12, wherein said discrimination means discriminates an image state in each said block in accordance with the difference between the image density of the respective pixel data in that block.

15. An image processing apparatus comprising:
input means for entering pixel data representing image density, a plurality of two-dimensional pixel data entered by said input means defining a block and all of said pixel data defining a number of said blocks;
discrimination means for discriminating an image state in each said block; and
reproduction means for performing a half tone process for said plurality of pixed data in each said block to reproduce said pixed data as a half tone image, said reproduction means including switching means for switching modes for performance of said half tone process in accordance with the result of discrimination by said discrimination means, one said mode including production of one image pattern unit from said plurality of pixel data in one said block.

16. An image processing apparatus according to claim 15, wherein said switching means is operable to switch said reproduction means from said one mode for performing a half tone process to another mode in which said reproducing means produces one pattern unit from one pixel datum.

17. An image processing apparatus according to claim 15, wherein said switching means switches said modes on the basis of the result of discrimination by said discrimination means.

18. An image processing apparatus according to claim 15, wherein said discrimination means discriminates an image state in each said block in accordance with difference between the image density of the respective pixel data in that block.

19. An image processing apparatus comprising:
input means for entering digital pixel data representing image density, a plurality of tow-dimensional pixel data defining a block and all of said pixel data defining a number of said blocks; and
generation means for providing a binary signal representing said digital pixel data by performing a process for each said block, said generation means including discrimination means for discriminating an image state in each said block and for switching modes for performing said process for each said block in accordance with the result of discrimination by said discrimination means.

20. An image processing apparatus according to claim 19, wherein said generation means includes producing means for producing image patterns and wherein said generation means determines whether that each image pattern produced by said producing means is composed of one of (1) one pixel datum, and (2) a plurality of pixel data defining one said block, on the basis of the result of discrimination by said discrimination means.

21. An image processing apparatus according to claim 19, wherein said discrimination means discriminates an image state in each block in accordance with the difference in image density in the pixel data in that block.

* * * * *